United States Patent Office 3,182,063
Patented May 4, 1965

3,182,063
SUBSTITUTED 4-THIAZOLIDINONES AND PROCESS THEREFOR
Gerhard Satzinger, Memmingen, Allgau, Germany, assignor to Warner-Lambert Pharmaceutical Company, Morris Plains, N.J., a corporation of Delaware
No Drawing. Filed Mar. 6, 1961, Ser. No. 93,318
10 Claims. (Cl. 260—293.4)

The present invention relates to new and novel substituted 4-thiazolidinones of the formula:

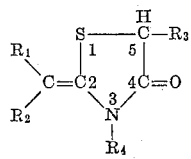

wherein $R_1$ is hydrogen, lower alkyl or aryl; $R_2$ is cyano,

in which $R_5$ is lower alkoxy or aryl, or —$SO_2$—$R_6$ in which $R_6$ is lower alkyl or aryl; $R_3$ is hydrogen or lower alkyl; and $R_4$ is lower alkyl, lower alkenyl, lower alkynyl, aryl, the acyl radical of an aliphatic carboxylic acid having 1 to 6 carbon atoms, or —$(CH_2)_n$—$R_7$ in which $n$ is 1 to 3 and $R_7$ is halogen, hydroxyl, aryl, the acyl radical of a lower alkyl carboxylic acid, carbalkoxy in which the alkyl portion is lower alkyl, or

in which $R_8$ is lower alkyl or when taken with the amino nitrogen atom forms a piperidino, morpholino or pyrrolidino group. The present invention also relates to new and novel methods of preparing the above substituted 4-thiazolidinones.

The terms "lower alkyl" and "lower alkoxy" as used in the specification and in the claims refer to branched and straight chain aliphatic groups having 1 to 6 carbon atoms. The terms "lower alkenyl" and "lower alkynyl" refer to branched or straight chain radicals having 2 to 6 carbon atoms and, respectively, a single double bond and a single triple bond.

The substituted 4-thiazolidinones of this invention have been found to have interesting pharmacological activity as analgesics, sedatives and anti-inflammatory agents. In use, they may be formulated with conventional pharmaceutical carriers to form such typical dosage units as tablets, capsules, solutions, suspensions, suppositories and the like. Certain of these new and novel 4-thiazolidinones are also valuable intermediates useful in the production of other compounds with interesting pharmacological activity.

For example, those compounds of this invention having the formula:

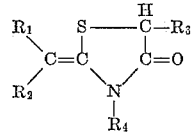

wherein $R_1$ is hydrogen, lower alkyl or aryl; $R_2$ is cyano; $R_3$ is hydrogen or lower alkyl; and $R_4$ is lower alkyl, may be reacted with an acid at moderate temperatures to hydrolyze the cyano substituent to an amide group as described and claimed in U.S. Patent No. 3,072,670 issued January 8, 1963.

In addition, those compounds of this invention having the formula:

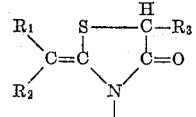

wherein $R_1$ is hydrogen, lower alkyl or aryl; $R_2$ is

in which $R_5$ is lower alkoxy; $R_3$ is hydrogen or lower alkyl; and $R_4$ is lower alkyl, may be reacted with a base at moderate temperatures and thereafter with an acid at low temperatures to hydrolyze the $R_2$ substituent to a carboxy group, as described and claimed in U.S. Patent No. 3,064,-003, issued November 13, 1962.

In addition, those compounds of this invention having the formula:

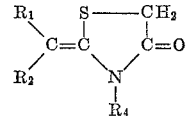

wherein $R_1$ is hydrogen, lower alkyl or aryl; $R_2$ is carbalkoxy wherein the alkyl portion is lower alkyl, and $R_4$ is lower alkyl, may be reacted in a suitable inert solvent with bromine to form compounds of the formula:

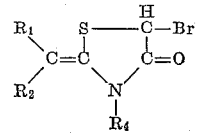

which in turn may be reacted with aliphatic or cyclic amines to form compounds of the formula:

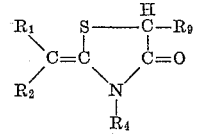

where $R_9$ is di-lower alkylamino or a cyclic amino radical selected from the group consisting of piperidino, morpholino, pyrrolidino or mono-lower alkyl derivatives thereof, as described and claimed in U.S. Patent No. 3,072,653, issued January 8, 1963.

It has now been found that the new and novel substituted 4-thiazolidinones of this invention of the formula:

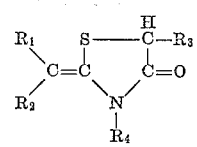

wherein $R_1$ is hydrogen, lower alkyl or aryl; $R_2$ is cyano,

in which $R_5$ is lower alkoxy or aryl, or —$SO_2$—$R_6$ in which $R_6$ is lower alkyl or aryl; $R_3$ is hydrogen or lower alkyl; and $R_4$ is lower alkyl, lower alkenyl, lower alkynyl, aryl, the acyl radical of an aliphatic carboxylic acid having 1 to 6 carbon atoms, or —$(CH_2)_n$—$R_7$ in which $n$ is 1 to 3 and $R_7$ is halogen, hydroxyl, aryl, the acyl radical of a lower alkyl carboxylic acid, carbalkoxy in which the alkyl portion is lower alkyl, or

in which $R_8$ is lower alkyl or when taken with the amino nitrogen atom forms a piperidino, morpholino or pyrrolidino group, may be prepared by the following reaction:

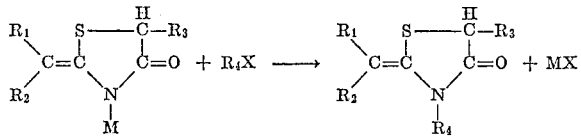

wherein M is an alkali metal such as sodium or potassium and X is halogen. The reaction is carried out by refluxing the reactants (preferably in equimolar proportions) in the presence of an inert solvent such as methanol, dimethylformamide and the like for a period of between about one-half to about eight hours. The product is recovered by crystallization.

The substituted 4-thiazolidinone starting materials of the formula:

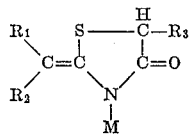

may be prepared as described in copending application, Serial No. 93,301, filed March 6, 1961, by the reaction of a nitrile of the formula:

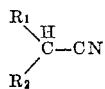

with a mercapto ester of the formula:

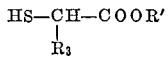

wherein R′ is lower alkyl, in the presence of an aliphatic alcohol having 1 to 6 carbon atoms and an alkali metal.

Alternately, it has been found that those substituted 4-thiazolidinones of this invention in which $R_4$ is a lower alkyl group, as above, may also be obtained by reacting the starting material of the formula:

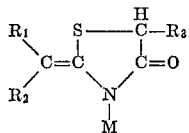

with a dialkylsulfate of the formula $R_4$—$OSO_2O$—$R_4$.

In addition, those substituted 4-thiazolidinones of this invention in which $R_4$ is the acyl radical of an aliphatic carboxylic acid having 1 to 6 carbon atoms may also be obtained by reacting the 4-thiazolidinone starting material as the free acid with the formula:

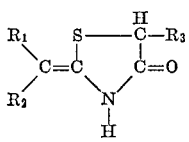

with the corresponding aliphatic acid anhydride.

The following examples are included in order further to illustrate the present invention:

EXAMPLE 1

*2-cyanomethylene-3-methyl-4-thiazolidinone*

16 g. (0.1 mole) of the sodium salt of 2-cyanomethylene-4-thiazolidinone is thoroughly mixed with 13 ml. (0.1 mole) dimethylsulfate. Upon warming the mixture, a vigorous reaction takes place. The reaction mixture is cooled and is taken up with 1 N NaOH. The solids are recovered by filtration and crystallized from 96% ethanol to yield colorless crystals of 2-cyanomethylene - 3 - methyl - 4 - thiazolidinone, melting point 140° C.

*Analysis.*—Calc.: C, 46.73; H, 3.93; N, 18.16; S, 20.80. Found: C, 46.99; H, 4.02; N, 18.54; S, 20.86.

EXAMPLE 2

*2-cyanomethlene-3acetyl-4-thiazolidinone*

14 g. (0.1 mole) 2-cyanomethylene-4-thiazolidinone are heated with 60 ml. acetic anhydride until a solution is obtained. 0.5 ml. concentrated $H_2SO_4$ are then added. The mixture is allowed to stand, whereupon crystals of 2-cyanomethylene-3-acetyl-4-thiazolidinone separate. Yield: 8 g. (45%), melting point 220–223° C., light yellow crystals from acetic acid.

*Analysis.*—Calc.: C, 46.04; H, 3.52; N, 15.35; S, 17.56. Found: C, 45.97; H, 3.86; N, 15.00; S, 17.47.

EXAMPLE 3

*2-cyanomethylene-3-(2-diethylaminoethyl)-4-thiazolidinone*

A freshly prepared methanol solution of 0.1 mole β-chloroethyldiethylamine (prepared from 27 g. of the amine hydrochloride and a solution of 2.3 g. sodium in 150 ml. methanol) is added to a solution of 16 g. (0.1 mole) of the sodium salt of 2-cyanomethylene-4-thiazolidinone in 100 ml. methanol. The mixture is refluxed for 1 hour, filtered and the methanol is distilled off under vacuum. The residue is taken up with ethyl acetate and ether. The mixture is filtered and the organic layer is saturated with HCl. Recrystallization from absolute ethanol yields 15 g. (53%) of the hydrochloride salt of 2-cyanomethylene-3-(2 - diethylaminoethyl) - 4 - thiazolidinone, melting point 175–177° C., colorless crystals.

*Analysis.*—Calc.: C, 47.91; H, 6.58; N, 15.24; S, 11.63; Cl, 12.86. Found: C, 47.88; H, 6.62; N, 14.88; S, 11.53; Cl, 13.04.

EXAMPLE 4

*2-cyanomethylene-3-(2-piperidinoethyl)-4-thiazolidinone*

16 g. (0.1 mole) 2-cyanomethylene-4-thiazolidinone is reacted with a freshly prepared methanol solution of 0.1 mole of N-(2-chloroethyl) piperidine and the product is recovered and purified as described in Example 3 to yield 17.5 g. (62%) of the hydrochloride salt of 2-cyanomethylene-3-(2-piperidinoethyl)-4-thiazolidinone, melting point 247–249° C., dec., colorless crystals from 96% ethanol.

*Analysis.*—Calc.: C, 50.07; H, 6.30; N, 14.60; S, 11.13; Cl, 12.32. Found: C, 50.39; H, 6.09; N, 14.56; S, 10.99; Cl, 12.20.

EXAMPLE 5

*2-carbethoxymethylene-3-methyl-4-thiazolidinone*

21 g. (0.1 mole) of the sodium salt of 2-carbethoxymethylene-4-thiazolidinone and 13 ml. (0.1 mole) dimethylsulfate are reacted and the product recovered and purified as described in Example 1. Yield: 16 g. (80%) of 2-carbethoxymethylene-3-methyl-4 - thiazolidinone, melting point 96–97° C., colorless needles from 96% ethanol.

*Analysis.*—Calc.: C, 47.75; H, 5.51; N, 6.96; S, 15.93. Found: C, 47.75; H, 5.46; N, 7.23; S, 15.69.

EXAMPLE 6

*2-carbethoxymethylene-3-ethyl-4-thiazolidinone*

24 g. (0.15 mole) ethyl iodide are added to a solution of 0.1 mole of the sodium salt of 2-carbethoxymethylene-4-thiazolidinone in 200 ml. absolute ethanol and the mixture is refluxed for 5 hours. After the mixture is cooled to room temperature, it is diluted with an equal volume of distilled water and acidified to yield 15 g. (70%) of 2-carbethoxymethylene-3 - ethyl - 4 - thiazolidinone, melting point 79–81° C., light yellow crystals from 50% methanol.

*Analysis.*—Calc.: C, 50.21; H, 6.09; N, 6.51; S, 14.90. Found: C, 50.26; H, 6.14; N, 6.54; S, 14.63.

EXAMPLE 7

*2-carbethoxymethylene-3-allyl-4-thiazolidinone*

12.1 g. (0.1 mole) allyl bromide is added with stirring to a solution of 20.9 g. (0.1 mole) of the sodium salt of 2-carbethoxymethylene-4-thiazolidinone in 150 ml. dimethylformamide. The mixture is heated to 80° C. for one-half hour and then is cooled to room temperature. The mixture is filtered and the filtrate is evaporated to dryness. The residue is crystallized from aqueous ethanol to yield 15.4 g. (68%) of 2-carbethoxymethylene-3-allyl-4-thiazolidinone as yellow needles, melting point 74–75° C.

*Analysis.*—Calc.: C, 52.84; H, 5.76; N, 6.16; S, 14.11. Found: C, 53.20; H, 5.73; N, 6.24; S, 13.89.

EXAMPLE 8

*2-carbethoxymethylene-3-propargyl-4-thiazolidinone*

Equimolar quantities of the sodium salt of 2-carbethoxymethylene-4-thiazolidinone and propargyl chloride are reacted and the reaction mixture processed as described in Example 7. Crystallization of the product from ethanol results in the preparation at a 90% yield of 2-carbethoxymethylene-3-propargyl-4-thiazolidinone as yellow crystals, melting point 128° C.

*Analysis.*—Calc.: C, 53.32; H, 4.93; N, 6.22; S, 14.23. Found: C, 53.58; H, 4.94; N, 6.13; S, 14.09.

EXAMPLE 9

*2-carbethoxymethylene-3-(β-bromoethyl)-4-thiazolidinone*

20.9 g. (0.1 mole) of the sodium salt of 2-carbethoxymethylene-4-thiazolidinone and 28.2 g. (0.15 mole) ethylene dibromide are reacted, the reaction mixture processed and the product crystallized as described in Example 7. Yield: 15.0 g. (51%) of 2-carbethoxymethylene-3-(β-bromoethyl)-4-thiazolidinone as yellow needles, melting point 105–106° C.

*Analysis.*—Calc.: C, 36.75; H, 4.11; N, 4.76; S, 10.90; Br, 27.16. Found: C, 36.83; H, 4.20; N, 4.98; S, 10.80; Br, 26.42.

EXAMPLE 10

*2-carbethoxymethylene-3-(β-hydroxyethyl)-4-thiazolidinone*

Equimolar quantities of the sodium salt of 2-carbethoxymethylene-4-thiazolidinone and ethylene bromohydrin are reacted and the reaction mixture processed as described in Example 7. Crystallization of the product from benzene/hexane 1:1 results in a 90% yield of 2-carbethoxymethylene-3-(β-hydroxyethyl)-4-thiazolidinone as yellow needles, melting point 106° C.

*Analysis.*—Calc.: C, 46.73; H, 5.66; N, 6.06; S, 13.86. Found: C, 46.73; H, 5.70; N, 5.98; S, 13.43.

EXAMPLE 11

*2-carbethoxymethylene-3-benzyl-4-thiazolidinone*

Equimolar quantities of the sodium salt of 2-carbethoxymethylene-4-thiazolidinone and benzyl chloride are reacted and the reaction mixture processed as described in Example 7. The residue is crystallized from benzene/hexane 1:3 to yield (72%) 2-carbethoxymethylene-3-benzyl-4-thiazolidinone as yellow needles, melting point 88–89° C.

*Analysis.*—Calc.: C, 60.63; H, 5.46; N, 5.05; S, 11.56. Found: C, 60.54; H, 5.47; N, 5.30; S, 11.43.

EXAMPLE 12

*2-carbethoxymethylene-3-(β-acetylethyl)-4-thiazolidinone*

Equimolar quantities of the sodium salt of 2-carbethoxymethylene-4-thiazolidinone and β-acetylethyl bromide are reacted as described in Example 7 to yield 2-carbethoxymethylene-3-(β-acetylethyl)-4-thiazolidinone, melting point 131° C.

*Analysis.*—Calc.: C, 51.34; H, 5.87; N, 5.45; S, 12.47. Found: C, 51.41; H, 5.83; N, 5.52; S, 12.43.

EXAMPLE 13

*2-carbethoxymethylene-3-carbethoxymethyl-4-thiazolidinone*

19 g. (0.1 mole) 2-carbethoxymethylene-4-thiazolidinone and 12.3 g. (0.1 mole) ethyl chloroacetate are added to a solution of 2.3 g. (0.1 mole) sodium in 150 ml. absolute ethanol and the mixture is refluxed for 5 hours. The mixture is cooled to room temperature and is then diluted with an equal volume of water. The precipitate is treated with 1 N NaOH and then washed with water to yield 10 g. (37%) of 2-carbethoxymethylene-3-carbethoxymethyl-4-thiazolidinone, melting point 98° C., yellow crystals from aqueous ethanol.

*Analysis.*—Calc.: C, 48.33; H, 5.54; N, 5.13; S, 11.73. Found: C, 48.47; H, 5.37; N, 5.16; S, 11.47.

EXAMPLE 14

*2-carbethoxymethylene-3-(2-diethylaminoethyl)-4-thiazolidinone*

Equimolar quantities of the sodium salt of 2-carbethoxymethylene-4-thiazolidinone and β-chloroethyldiethylamine are reacted as described in Example 3 to yield 15 g. (50%) of 2-carbethoxymethylene-3-(2-diethylaminoethyl)-4-thiazolidinone, boiling point 179° C. at 1 mm. of mercury. Treatment of this compound with HCl followed by recrystallization from absolute ethanol yields colorless crystals of the hydrochloride salt, melting point 182–183° C.

*Analysis (of the hydrochloride).*—Calc.: C, 48.36; H, 7.18; N, 8.67; S, 9.94; Cl, 10.99. Found: C, 48.42; H, 6.93; N, 9.01; S, 9.41; Cl, 11.74.

By procedures similar to that described in Example 14, the following two compounds are prepared:

EXAMPLE 15

The hydrochloride salt of 2-carbomethoxymethylene-3-(2-dimethylaminoethyl)-4-thiazolidinone, melting point 218–219° C., dec.

*Analysis.*—Calc.: C, 42.70; H, 6.10; N, 9.98; S, 11.42; Cl, 12.63. Found: C, 42.67; H, 6.11; N, 10.02; S, 11.21; Cl, 12.43.

EXAMPLE 16

The hydrochloride salt of 2-carbethoxymethylene-3-(3-dimethylaminopropyl)-4-thiazolidinone, melting point 214–215° C., dec.

*Analysis.*—Calc.: C, 46.67; H, 6.85; N, 9.07; S, 10.39; Cl, 11.48. Found: C, 45.99; H, 6.66; N, 9.46; S, 10.53; Cl, 11.62.

EXAMPLE 17

*2-benzoylmethylene-3-methyl-4-thiazolidinone*

Equimolar quantities of the sodium salt of 2-benzoylmethylene-4-thiazolidinone and dimethylsulfate are reacted and the product is recovered from the reaction mixture as described in Example 1 to yield 2-benzoylmethylene-3-methyl-4-thiazolidinone, melting point 167–168° C.

*Analysis.*—Calc.: C, 61.78; H, 4.75; N, 6.01; S, 13.74. Found: C, 61.74; H, 4.70; N, 5.87; S, 13.55.

EXAMPLE 18

*2-benzoylmethylene-3-allyl-4-thiazolidinone*

Equimolar quantities of the sodium salt of 2-benzoylmethylene-4-thiazolidinone and allyl bromide are reacted and the product is recovered from the reaction mixture as described in Example 7 to yield 2-benzoylmethylene-3-allyl-4-thiazolidinone, melting point 94–95° C.

*Analysis.*—Calc.: C, 64.84; H, 5.06; N, 5.40; S, 12.37. Found: C, 64.54; H, 4.89; N, 5.39; S, 12.35.

EXAMPLE 19

*2-benzoylmethylene-3-benzyl-4-thiazolidinone*

Equimolar quantities of the sodium salt to 2-benzoylmethylene-4-thiazolidinone and benyl chloride are reacted and the product is recovered and purified as described in Example 11 to yield 2-benzoylmethylene-3-benzyl-4-thiazolidinone, melting point 167° C.

*Analysis.*—Calc.: C, 69.87; H, 4.89; N, 4.52; S, 10.37. Found: C, 69.85; H, 4.96; N, 4.43; S, 9.86.

EXAMPLE 20

*2-benzoylmethylene-3-(2-dimethylaminoethyl)-4-thiazolidinone*

Equimolar quantities of the sodium salt of 2-benzoylmethylene-4-thiazolidinone and β-chloroethyldiethylamine are reacted and the product purified as described in Example 14 to yield the hydrochloride salt of 2-benzoylmethylene-3-(2-diethylaminoethyl) - 4 - thiazolidinone, melting point 221–223° C., dec.

*Analysis.*—Calc.: C, 57.33; H, 6.53; N, 7.89; S, 9.04; Cl, 9.99. Found: C, 57.41; H, 6.67; N, 7.64; S, 8.81; Cl, 9.82.

By a similar procedure, the following compound is prepared:

EXAMPLE 21

The hydrochloride salt of 2-benzoylmethylene-3-(3-dimethylaminopropyl) - 4 - thiazolidinone (as a monohydrate), melting point 235–237° C.

*Analysis.*—calc.: C, 53.55; H, 6.46; N, 7.80; S, 8.92; Cl, 9.88. Found: C, 53.96; H, 6.30; N, 7.64; S, 8.83; Cl, 9.94.

EXAMPLE 22

*2-phenylsulfonylmethylene-3-methyl-4-thiazolidinone*

Equimolar quantities of the sodium salt of 2-phenylsulfonylmethylene-4-thiazolidinone and dimethylsulfate are reacted and the product purified as described in Example 1 to yield 2-phenylsulfonylmethylene-3-methyl-4-thiazolidinone, melting point 154° C.

*Analysis.*—calc.: C, 49.05; H, 4.12; N, 5.20; S, 23.80. Found: C, 49.29; H, 4.28; N, 5.34; S, 23.92.

EXAMPLE 23

*2-phenylsulfonylmethylene-3-(2-diethylaminoethyl)-4-thiazolidinone*

Equimolar quantities of the sodium salt of 2-phenylsulfonylmethylene-4-thiazolidinone and β-chloroethyldiethylamine are reacted and the product purified as described in Example 14 to yield the hydrochloride salt of 2-phenylsulfonylmethylene-3-(2-diethylaminoethyl) - 4 - thiazolidinone, melting point 234° C., dec.

*Analysis.*—calc.: C, 49.15; H, 5.93; N, 7.17; S, 16.40; Cl, 9.07. Found: C, 48.96; H, 6.04; N, 7.18; S, 16.42; Cl, 9.17.

By a similar procedure, the following compound is prepared:

EXAMPLE 24

The hydrochloride salt of 2-phenylsulfonylmethylene-3-(3-dimethylaminopropyl) - 4 - thiazolidinone, melting point 189–190° C.

*Analysis.*—calc.: C, 47.80; H, 5.61; N, 7.43; S, 17.02; Cl, 9.41. Found: C, 47.70; H, 5.69; N, 7.44; S, 16.74; Cl, 9.42.

EXAMPLE 25

*2-(α-carbethoxybenzylidene)-3-methyl-4-thiazolidinone*

Equimolar quantities of the sodium salt of 2-(α-carbethoxybenzylidene)-4-thiazolidinone and dimethylsulfate are reacted and the product purified as described in Example 1 to yield 2-(α-carbethoxybenzylidene)-3-methyl-4-thiazolidinone, melting point 88–89° C.

*Analysis.*—calc.: C, 60.63; H, 5.46; N, 5.05; S, 11.56. Found: C, 60.69; H, 5.72; N, 5.42; S, 11.52.

EXAMPLE 26

*2-(α-carbethoxybenzylidene)-3-(2-diethylaminoethyl)-4-thiazolidinone*

Equimolar quantities of the sodium salt of 2-(α-carbethoxybenzylidene)-4-thiazolidinone and β-chloroethyldiethylamine are reacted and the product purified as described in Example 14 to yield the hydrochloride salt of 2-(α-carbethoxybenzylidene)- 3 - (2-diethylaminoethyl)-4-thiazolidinone, melting point 172–173° C.

*Analysis.*—calc.: C, 57.19; H, 6.82; N, 7.02; S, 8.04; Cl, 8.89. Found: C, 57.38; H, 6.79; N, 7.03; S, 7.50; Cl, 8.61.

It is understood that the foregoing detailed description is given merely by way of illustration and that many variations may be made therein without departing from the spirit of my invention.

Having described my invention, what I desire to secure by Letters Patent is:

1. Compounds of the formula:

$$\begin{array}{c} R_1 \\ \diagdown \\ R_2 \end{array} C = C \begin{array}{c} S \\ \diagup \\ \diagdown \\ N \\ | \\ R_4 \end{array} \begin{array}{c} H \\ | \\ C - R_3 \\ | \\ C = O \end{array}$$

wherein $R_1$ is a member selected from the group consisting of hydrogen, lower alkyl, and phenyl; $R_2$ is a member selected from the group consisting of cyano, $$-\overset{O}{\underset{\|}{C}}-O-CH_3,\ -\overset{O}{\underset{\|}{C}}-O-C_2H_5,\ -\overset{O}{\underset{\|}{C}}-\!\!\!\diagup\!\!\!\diagdown\!\!\!,\ -SO_2-\!\!\!\diagup\!\!\!\diagdown$$

and $-SO_2-CH_3$; $R_3$ is a member selected from the group consisting of hydrogen and lower alkyl; and $R_4$ is a member selected from the group consisting of lower alkyl, lower alkenyl, lower alkynyl, phenyl, $$-CH_2-\!\!\!\diagup\!\!\!\diagdown,\ -\overset{O}{\underset{\|}{C}}-CH_3,\ -CH_2-CH_2-OH$$

$$-CH_2-CH_2-Br,\ -CH_2-CH_2-N\!\!\diagdown_{CH_3}^{CH_3},\ -CH_2-CH_2-\overset{O}{\underset{\|}{C}}-CH_3$$

$$-CH_2-CH_2-CH_2-N\!\!\diagdown_{CH_3}^{CH_3},\ -CH_2-CH_2-N\!\!\diagdown_{C_2H_5}^{C_2H_5}$$

$$-CH_2-CH_2-N\!\!\diagup\!\!S\quad \text{and}\ -CH_2-\overset{O}{\underset{\|}{C}}-O-C_2H_5$$

2. 2-cyanomethylene-3-(2-diethylaminoethyl)-4-thiazolidinone.

3. 2-cyanomethylene-3-(2-piperidinoethyl)-4-thiazolidinone.

4. 2-carbethoxymethylene-3-propargyl-4-thiazolidinone.

5. 2-carbethoxymethylene-3-(β-bromoethyl)-4-thiazolidinone.

6. 2-carbethoxymethylene-3-(β-hydroxyethyl)-4-thiazolidinone.

7. 2-carbethoxymethylene-3-benzyl-4-thiazolidinone.

8. 2-carbethoxymethylene-3-(β-acetylethyl)-4-thiazolidinone.

9. 2-carbethoxymethylene-3-carbethoxymethyl-4-thiazolidinone.

10. 2-carbethoxymethylene-3-(3-dimethylaminopropyl)-4-thiazolidinone.

References Cited by the Examiner

UNITED STATES PATENTS

| | | | |
|---|---|---|---|
| 2,617,808 | 11/52 | Schenck et al. | 260—306.7 |
| 2,865,924 | 12/58 | Asinger et al. | 260—306.7 |
| 2,957,869 | 10/60 | Strube | 260—240 |
| 2,993,891 | 7/61 | Zimmer | 260—240 |
| 3,064,003 | 11/62 | Satzinger | 260—306.7 |

(Other references on following page)

FOREIGN PATENTS 561,659 8/58 Canada.
641,882 8/50 Great Britain.
785,334 10/57 Great Britain.

OTHER REFERENCES

Elderfield: "Heterocyclic Compounds," vol. 5, pages 700–701, John Wiley and Sons, Inc. (1957).

Chemical Abstracts, vol. 32, col. 3396 (1938), abstract of Dains et al., Univ. Kansas Sci. Bull., vol. 24, pages 15–24 (1936).

Pennington et al.: J. Am. Chem. Soc., vol. 75, pages 109–114 (1953).

IRVING MARCUS, *Primary Examiner.*

JOHN D. RANDOLPH, WALTER A. MODANCE, *Examiners.*